United States Patent [19]

Autruong et al.

[11] Patent Number: 5,150,368
[45] Date of Patent: Sep. 22, 1992

[54] MINIMIZATION OF MODEM RETRANSMISSIONS

[75] Inventors: Tho Autruong, Mountain View; Daniel Lai, Los Altos, both of Calif.

[73] Assignee: Rolm Systems, Santa Clara, Calif.

[21] Appl. No.: 507,283

[22] Filed: Apr. 10, 1990

[51] Int. Cl.⁵ .................. H04L 1/18; G06F 11/00
[52] U.S. Cl. ...................... 371/31; 371/5.1; 371/32
[58] Field of Search ............. 371/31, 32, 33, 5.1

[56] References Cited

U.S. PATENT DOCUMENTS

| | | | |
|---|---|---|---|
| 3,824,547 | 7/1974 | Green et al. | 371/32 |
| 4,430,736 | 2/1984 | Scholz | 371/31 |
| 4,763,293 | 8/1988 | Takei et al. | 371/31 |
| 4,803,684 | 2/1989 | Kozuki et al. | 371/31 |
| 4,885,749 | 12/1989 | Golden | 371/32 |
| 4,887,162 | 12/1989 | Arai | 371/31 |
| 4,907,277 | 3/1990 | Callens et al. | 371/31 |
| 4,943,964 | 7/1990 | Hatanaka et al. | 371/31 |

*Primary Examiner*—Charles E. Atkinson
*Attorney, Agent, or Firm*—Michael B. Einschlag

[57] ABSTRACT

Method and apparatus for minimizing retransmissions during communication in a modem-to-modem communications system. The inventive method includes the steps of: (a) receiving a data packet and determining a checksum; (b) comparing the checksum with a checksum embedded in the data packet; (c) if the checksums are the same, transmitting a signal which indicates that the data packet was received correctly and returning to step (a); (d) if the checksums are different, incrementing a counter; (e) checking the counter, if the counter is less than a predetermined threshold, saving the data packet with its embedded checksum, transmitting a signal which indicates that the data packet was not received correctly and returning to step (a); (f) otherwise, bit averaging the newly received data packet with previously received and stored data packets, including the embedded checksums, and determining a checksum for the bit averaged data packet; (g) if the bit averaged, embedded checksum matches the determined checksum for the bit averaged data packet, transmitting an "OK" signal and returning to step (a); and (h) if the bit averaged, embedded checksum does not match the determined checksum for the bit averaged data packet, saving the newly received data packet with its embedded checksum, transmitting a signal which indicates that the data packet was not received correctly and returning to step (a).

7 Claims, 3 Drawing Sheets

MINIMIZATION OF MODEM RETRANSMISSIONS

TECHNICAL FIELD OF THE INVENTION

The present invention pertains to method and apparatus for minimizing retransmissions in a modem-to-modem communications system and, in particular, to method and apparatus for minimizing retransmissions in a modem-to-modem communications system which does not utilize error-correcting codes (ECC).

BACKGROUND OF THE INVENTION

In a typical modem-to-modem communications system without error-correcting code (ECC), data packets are transmitted serially between the modems along with their embedded checksums. If the embedded checksum of a received data packet matches the checksum determined by the receiver modem ("received checksum"), the receiver modem deems the data packet to have been received correctly and the receiver modem will then transmit a signal to the transmitter modem which indicates that the data packet has been received correctly ("OK" signal). However, if the received checksum does not match the embedded checksum, the receiver modem deems the data packet to have been received incorrectly and the receiver modem will transmit a signal to the transmitter modem which indicates that the data packet has been received incorrectly ("not-OK" signal).

In a typical such modem-to-modem communications system, if the transmitter modem receives no response from the receiver modem or if the transmitter modem receives a "not-OK" signal, the transmitter modem will retransmit the data packet. Further, in such a typical system, such retransmission will continue until the transmitter modem receives an "OK" signal or until a predetermined time period has elapsed without the transmitter modem having received any signal.

As one can readily appreciate from the above, since incorrectly received data packets are discarded by the receiver modem and the data packet is retransmitted, the number of retransmissions may be high. One solution which is used to minimize such retransmissions which is well known in the art is to utilize an ECC in conjunction with the transmission of the data packets. However, this solution is incompatible with modem protocols which are used in existing modem-to-modem communications systems which do not utilize ECC. In addition, retrofitting such systems with an ECC capability may not be practical for at least two reasons: (a) there is typically a high cost associated with such retrofitting and (b) there is a lack of technical expertise in the industry relating to older communications systems which are comprised of modems that do not utilize ECC. Nevertheless, despite these problems in retrofitting, it is highly desirable, from an efficiency standpoint, to minimize retransmissions on modem-to-modem communications systems which do not utilize ECC.

As a result of the above, there is a need for method and apparatus for minimizing retransmissions between modems which do not utilize ECC and which, therefore, may be used in conjunction with older, transmitter modems which do not utilize ECC.

SUMMARY OF THE INVENTION

Embodiments of the present invention advantageously satisfy the above-identified need in the art and provide method and apparatus for minimizing retransmissions in a modem-to-modem communications system and, in particular, provide method and apparatus for minimizing retransmissions in a modem-to-modem communications system which does not utilize error-correcting codes (ECC). As a result, embodiments of the present invention advantageously provide efficient transmission between older, transmitter modems which do not utilize ECC and other types of modems.

In particular, an embodiment of the inventive method comprises the steps of: (a) receiving a data packet and determining a checksum; (b) comparing the checksum with a checksum embedded in the data packet; (c) if the checksums are the same, transmitting a signal which indicates that the data packet was received correctly and returning to step (a); (d) if the checksums are different, incrementing a counter; (e) checking the counter, if the counter is less than a predetermined threshold, saving the data packet with its embedded checksum, transmitting a signal which indicates that the data packet was not received correctly and returning to step (a); (f) otherwise, bit averaging the newly received data packet with previously received and stored data packets, including the embedded checksums, and determining a checksum for the bit averaged data packet; (g) if the bit averaged, embedded checksum matches the determined checksum for the bit averaged data packet, transmitting an "OK" signal and returning to step (a); and (h) if the bit averaged, embedded checksum does not match the determined checksum for the bit averaged data packet, saving the newly received data packet with its embedded checksum, transmitting a signal which indicates that the data packet was not received correctly and returning to step (a).

In a preferred embodiment of the present invention, the step of bit averaging comprises bit averaging the last three incorrectly received data packets, i.e., bit averaging the most recently received data packet and the last two received and stored data packets along with their embedded checksums. The following illustrates how bits, including bits in the checksums, are averaged in accordance with the present invention. Let $b_c(i)$ denote the ith bit averaged bit of a data packet. In accordance with the preferred embodiment of the present invention, $b_c(i)$ is given by uniform bit averaging as follows:

$$b_c(i) = b_1(i)^* b_2(i) + b_{1//}(i)^* b_3(i) + b_2(i)^* b_3(i)$$

where:

$b_1(i)$ = the ith bit of the 1st incorrectly received data packet $b_2(i)$ = the ith bit of the 2nd incorrectly received data packet $b_3(i)$ = the ith bit of the 3rd incorrectly received data packet and

* denotes the logical AND operation

+ denotes the logical 0 operation

The inventive method is advantageously compatible with any modem-to-modem communications system that simply discards data packets based on a checksum mismatch. In addition, the uniform bit averaging of the preferred embodiment is appropriate whenever there is no knowledge of how severely incorrect each data packet may be and, therefore, each data packet is treated with equal weight. However, in further embodiments, different weights may be applied to data packets so that certain data packets may have a larger weight than others. For example, some modems have a knowledge of the signal-to-noise ratio of a transmission line connecting them to other modems. In such an environment, data packet weighting can be made to vary with the signal-to-noise ratio of the line and/or data packet weighting could be assigned on the basis of a time-weighted average. With a time-weighted technique, different weights are given to data packets depending on their time of reception. For example, less weight could be given to older data packets, thereby reducing their contribution in the averaging process.

In any event, in an embodiment using weighting for three data packets, $b_c(i)$ is given as follows:

$$\text{if } [a_1 b_1(i) + a_2 b_2(i) + a_3 b_3(i)] < (a_1 + a_2 + a_3)/2, \text{ then}$$
$$b_c(i) = 0$$

$$\text{if } [a_1 b_1(i) + a_2 b_2(i) + a_3 b_3(i)] > (a_1 + a_2 + a_3)/2, \text{ then}$$
$$b_c(i) = 1$$

where:
$a_1$ = the weight of the 1st incorrectly received data packet
$a_2$ = the weight of the 2nd incorrectly received data packet
$a_3$ = the weight of the 3rd incorrectly received data packet
$+$ denotes an arithmetic operation Although the preferred embodiment utilizes a moving window of three data packets for predicting a correctly received data packet, another embodiment comprises the use of an "always-growing" number of incorrectly received data packets by accumulating the incorrectly received data packets. In such a case, for n incorrectly received data packets, $b_c(i)$ is given as follows:

$$\text{if } \text{Sum}_{j=1}^{n}[a_j b_j(i)] < \left[\text{Sum}_{j=1}^{n}(a_j)\right]/2, \text{ then} \quad \text{(i)}$$

$$b_c(i) = 0$$

$$\text{if } \text{Sum}_{j=1}^{n}[a_j b_j(i)] \geq \left[\text{Sum}_{j=1}^{n}(a_j)\right]/2, \text{ then} \quad \text{(ii)}$$

$$b_c(i) = 1$$

Further embodiments of the present invention are used in modem-to-modem communications systems wherein a data packet comprises an indication of data packet length. In such further embodiments, the length of a received data packet is compared with the length indicator which is embedded in the received data packet. However, if the embedded length indicator is incorrect or does not match the length of the received data packet, the data packet is discarded because, in this case, it becomes impossible to align the newly received data packet with past, incorrectly received data packets.

Still further embodiments of the present invention are used in modem-to-modem communications systems wherein the data packet comprises an indication of data packet count or any other type of data packet identification. In such still further embodiments, the bit averaged identification is compared with an expected identifier. For example, a data packet may contain an embedded identifier such as, for example, a sequence number. If the newly received data packet has an incorrect identifier, then bit averaging in accordance with the present invention continues.

BRIEF DESCRIPTION OF THE DRAWING

A complete understanding of the present invention may be gained by considering the following detailed description in conjunction with the accompanying drawing, in which.

DETAILED DESCRIPTION

Figure 1:
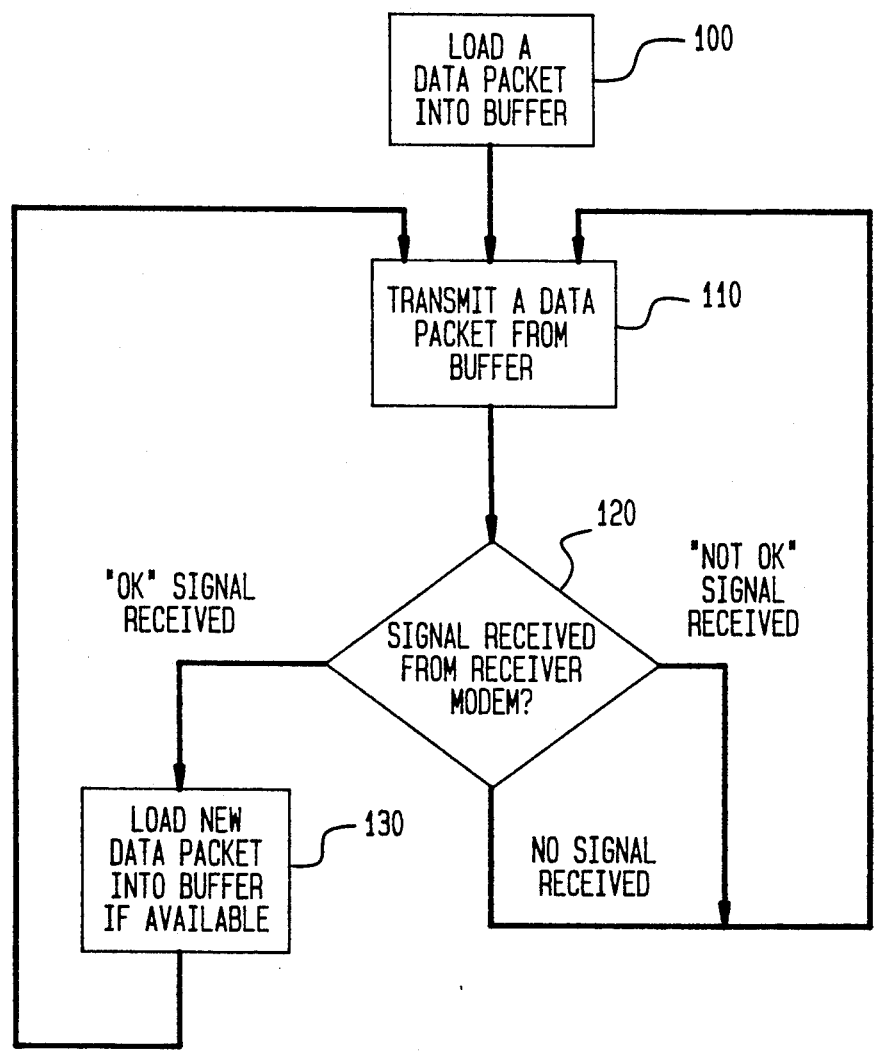
FIGs. 1 and 2 show a flowchart of the operation of a preferred embodiment of the present invention which is implemented in a modem-to-modem communications system comprised of a transmitter modem and a receiver modem and FIG. 3 shows a block diagram of apparatus for implementing uniform bit averaging in accordance with a preferred embodiment of the present invention.

FIG. 1 shows a flowchart of the operation of a preferred embodiment of the present invention which is implemented in a modem-to-modem communications system comprised of transmitter modem 10 and receiver modem 20. Those of ordinary skill in the art readily understand and appreciate the manner in which a modem transmits data packets, receives data packets, sends "handshake" signals between a transmitter modem and a receiver modem in the form of acknowledgements, and so forth. Because of this, and for ease of understanding the present invention, the following description will omit the well known portions of a modem which carry out these well known functions and will instead concentrate on the portions of a modem which are utilized to embody the present invention.

As is shown in FIG. 1, in relevant part, transmitter modem 10 operates as follows. At box 100, transmitter modem 10 loads a new data packet into a buffer and control is transferred to box 110. At box 110, transmitter modem 10 transmits a data packet to receiver modem 20 and, afterwards, control is transferred to box 120. At box 120, transmitter modem 10 waits to receive signals from receiver modem 20. As is well known to those of ordinary skill in the art, the function carried out by box 120 may be initiated periodically after a predetermined time period has elapsed, for example, after a timer counter has reached a predetermined threshold, or the function carried out by box may be initiated upon the receipt of a signal from receiver modem. Notwithstanding the particular event which triggers the initiation of the function carried out by box the manner in which control may be transferred to box in transmitter modem 10 is well known to those of ordinary skill in the art.

At box 120, if it is determined that transmitter modem 10 has received a signal from receiver modem 20 which acknowledges the receipt of a correctly received data packet ("OK" signal) —for example, such an "OK" signal may indicate that the checksum received by receiver modem 20 for the last data packet matched the checksum embedded in that data packet, then control is transferred to box 130. However, at box 120, if it is determined that transmitter modem 10 has received a signal from receiver modem 20 which notifies transmitter modem 10 that the last data packet transmitted was received incorrectly ("not-OK" signal) —for example, such a "not-OK" signal may indicate that the checksum received by receiver modem 20 for the last data packet did not match the checksum embedded in that data packet, then control is transferred to box 110 to retransmit the last data packet. Lastly, at box 120, if it is determined that transmitter modem 10 has not received a signal from receiver modem 20 for a period of time which is longer than a predetermined time period, then control is transferred to box 110 to retransmit the last data packet. Of course, those of ordinary skill in the art appreciate that a transmitter modem may keep separate track of data packets which are transmitted and for which no acknowledgement of the transmission has been received in order to prevent repeated transmission because, for example, a communications line between the transmitter modem and receiver modem is broken. Such a function is well known to those of ordinary skill in the art and will not be further described.

At box 300, receiver modem 20 receives a data packet from transmitter modem 10 and control is then transferred to box 310. At box 310, receiver modem 20 determines whether the data packet has been received completely by, for example, determining whether the length embedded in the data packet matches the received length. If the embedded length indicator is incorrect or does not match the length of the received data packet, the data packet is discarded (the data packet is discarded because, in this case, it becomes impossible to align the newl received data packet with past, incorrectly received data packets) and control is transferred to box 320, whereas, if the lengths do match, control is transferred to box 330. At box 320, receiver modem 20 transmits a signal to transmitter modem 10 which indicates that the last data packet was received incorrectly ("not-OK" signal), and, as described above, when this signal is received by transmitter modem 10, control in transmitter modem 10 is transferred to box 120 therein.

At box 330, the checksum received by receiver modem 20 is compared with the checksum embedded in the received data packet. If the checksums are equal, control is transferred to box 340, whereas, if the checksums are not equal, control is transferred to box 350. At box 340, receiver modem 20: (a) clears the count of incorrectly received data packets; (b) clears buffers which store incorrectly received data packets; and (c) transmits a signal to transmitter modem 10 which indicates that the last data packet was correctly received ("OK" signal), and, as described above, when this signal is received by transmitter modem 10, control in transmitter modem 10 is transferred to box 120 therein.

At box 350, receiver 20 stores the incorrectly received data packet in a buffer and increments a counter which contains a count of incorrectly received data packets. Then, control is transferred to box 360.

At box 360, receiver modem 20 determines whether the count of incorrectly received data packets is greater than a predetermined number, for example, in the preferred embodiment the predetermined number is equal to 2. If not, control is transferred to box 320, whereas, if the count exceeds the predetermined number, control is transferred to box 370.

Figure 3:
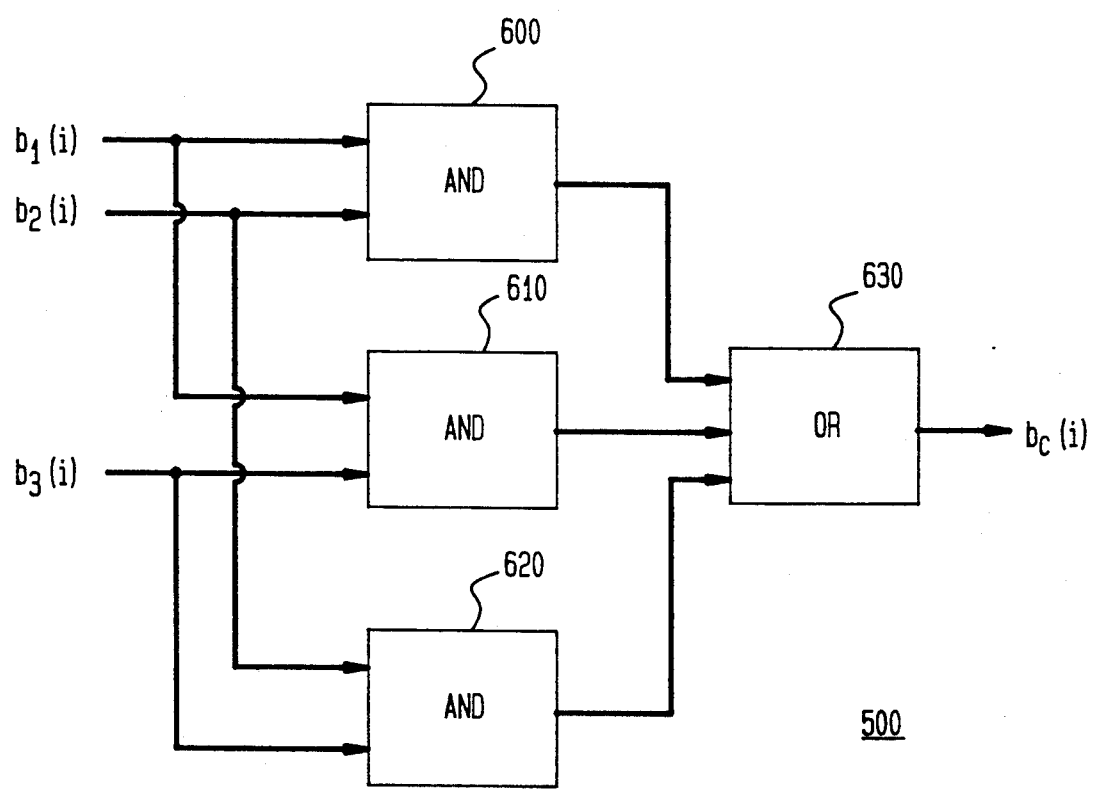

At box 370, receiver modem 20 predicts a new data packet in accordance with, for example, the apparatus shown in FIG. 3. As a result, this provides a new checksum which is the embedded checksum for the predicted data packet. Then control is transferred to box 380.

At box 380, receiver modem 20 compares the checksum of the predicted data packet with the embedded checksum of the predicted data packet. If the checksums are equal, control is transferred to box 390, whereas, if the checksums are not equal, then control is transferred to box 320. In this embodiment, the buffers which contain incorrectly received data packets contain the last two incorrectly received data packets and the most recently received data packet and earlier, incorrectly received data packets are discarded.

At box 390, receiver modem determines whether the predicted data packet identifier is correct. For example, as is well known to those of ordinary skill in the art, a data packet may comprise an indication of data packet count or any other type of data packet identification such as, for example, a sequence number. If the predicted data packet identifier is not correct, control is transferred to box 320, whereas if the data identifier is correct, control is transferred to box 340.

Figure 2:
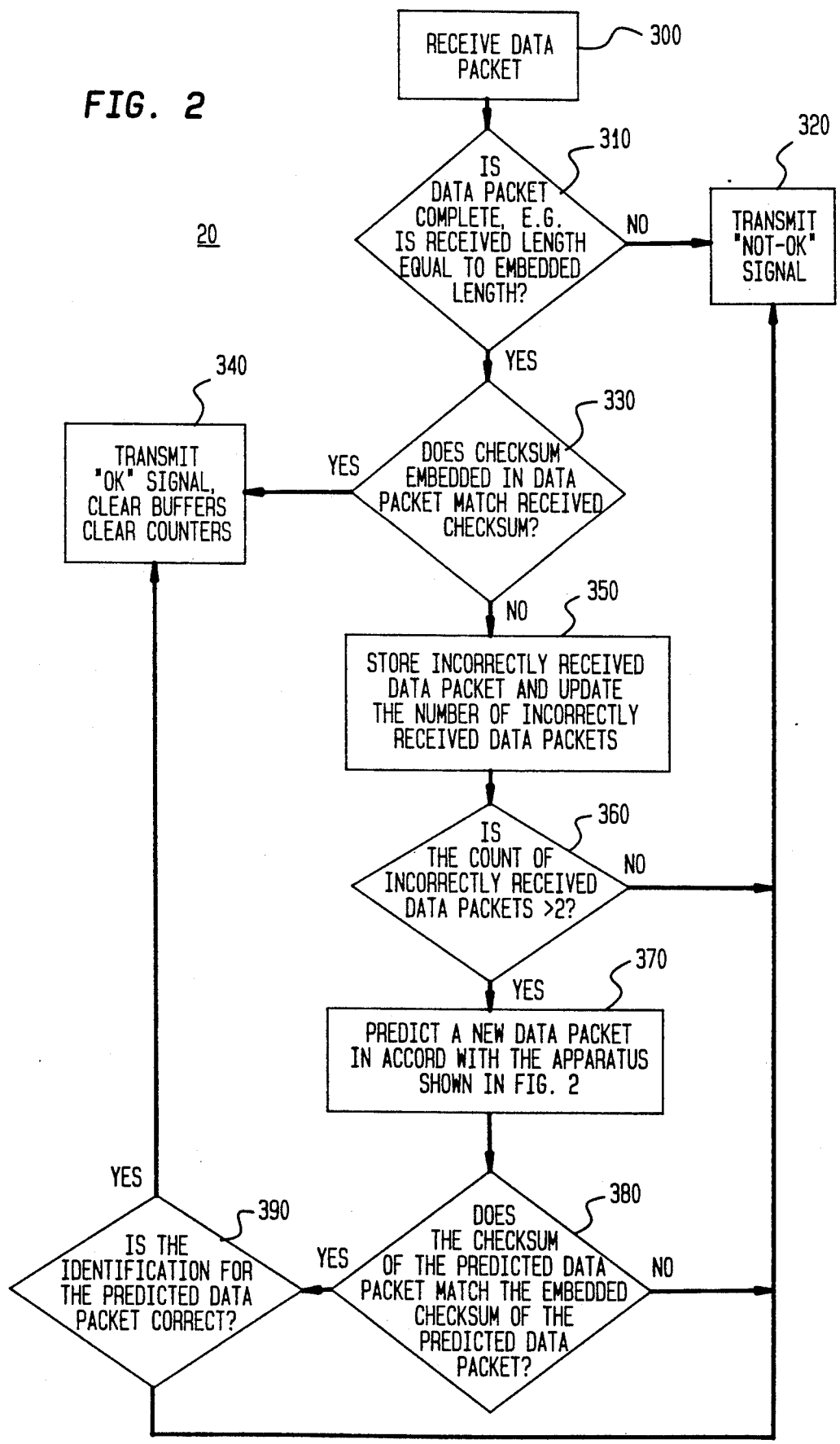

As one of ordinary skill in the art can readily appreciate, the flowcharted operation shown in FIGS. 1 and 2 may readily be implemented on any one of a number of microprocessors which are commercially available in connection with appropriate and well known memory devices which are also commercially available.

In a preferred embodiment of the present invention, the method used to predict a new data packet which was described with reference to box 370 of FIG. 2 is carried out by bit averaging. More specifically, the preferred embodiment of the prediction method comprises bit averaging the last three incorrectly received data packets, i.e., the most recently received data packet and the last two received and stored data packets, along with their embedded checksums. The following illustrates how the bits, including the checksums, are averaged to produce a predicted data packet. In accordance with the preferred embodiment of the present invention, $b_c(i)$, the ith bit of the predicted data packet, is given by uniform bit averaging as follows:

$$b_c(i) = b_1(i)*b_2(i) + b_1(i)*b_3(i) + b_2(i)*b_3(i)$$

where:

$b_1(i)$ = the ith bit of the 1st incorrectly received data packet $b_2(i)$ = the ith bit of the 2nd incorrectly received data packet $b_3(i)$ = the ith bit of the 3rd incorrectly received data packet and

* denotes the logical AND operation

+ denotes the logical OR operation

FIG. 2 shows a block diagram of apparatus 500 for implementing the uniform bit averaging in accordance with a preferred embodiment of the present invention. As shown in FIG. 3, the ith bits from the 1st and 2nd data packets are applied as input to AND 600; the ith bits from the 1st and 3rd data packets are applied as input to AND 610; and the ith bits from the 2nd and 3rd data packets are applied as input to AND 620. The outputs from AND 600, 610, and 620 are applied as input to OR 630 and the output from OR 630 is the ith bit of the predicted data packet.

The inventive modem data prediction method is advantageously compatible with any modem-to-modem communications system that simply discards data packets based on a checksum mismatch. In addition, the uniform bit averaging of the preferred embodiment is appropriate whenever there is no knowledge of how severely incorrect each data packet may be and, therefore, each data packet is treated with equal weight. However, in further embodiments, different weights are applied to data packets so that certain packets may have a larger weight than others. For example, some modems have a knowledge of the signal-to-noise ratio of a transmission line connecting them to other modems. In such an environment, data packet weighting can be made to vary with the signal-to-noise ratio of the line and/or data packet weighting could be assigned on the basis of a timeweighted average. With a time-weighted technique, different weights would be given to data packets depending o their time of reception. For example, less weight could be given to older data packets, thereby reducing their contribution in the averaging process. It should be clear to those of ordinary skill in the art that the apparatus of FIG. 3 may also be implemented in a microprocessor and that such an embodiment would be preferred for embodiments which utilize non-uniform weights.

In any event, in an embodiment using a microprocessor for weighting three data packets, $b_c(i)$ is given as follows as equation A:

if $[a_1b_1(i)+a_2b_2(i)+a_3b_3(i)]<(a_1+a_2+a_3)/2$, then
$b_c(i)=0$ if $[a_1b_1(i)+a_2b_2(i)+a_3b_3(i)]>(a_1+a_2+a_3)/2$, then
$b_c(i)=1$ where:
$a_1$ = the weight of the 1st incorrectly received data packet
$a_2$ = the weight of the 2nd incorrectly received data packet
$a_3$ = the weight of the 3rd incorrectly received data packet
+ denotes the arithmetic operation Although the preferred embodiment utilizes a moving window of three data packets for predicting a correctly received data packet, another embodiment comprises the use of an "always-growing" number of incorrectly received data packets by accumulating the incorrectly received data packets. In such a case, for n incorrectly received data packets, $b_c(i)$ is given as follows:

$$\text{if } \underset{j=1}{\overset{n}{\text{Sum}}}[a_jb_j(i)] < \left[\underset{j=1}{\overset{n}{\text{Sum}}}(a_j)\right]/2, \text{ then} \quad (i)$$

$$b_c(i) = 0$$

$$\text{if } \underset{j=1}{\overset{n}{\text{Sum}}}[a_jb_j(i)] \geq \left[\underset{j=1}{\overset{n}{\text{Sum}}}(a_j)\right]/2, \text{ then} \quad (ii)$$

$$b_c(i) = 1$$

It should be clear to those skilled in the art that further embodiments of the present invention may be made without departing from its teachings. Further, although the term data packet has been used in this description, the packets which are transmitted between modems need not represent data signals and may include digital representations of analog signals as well.

As one can readily appreciate, it is within the spirit of the present invention that embodiments thereof may be fabricated wherein one need not store incorrectly received data packets prior to performing bit averaging thereof. For example, the contribution of each incorrectly received data packet to a bit average, i.e., $a_jb_j(i)$, is determined, on an accumulating basis. Then the accumulated contributions of the bit average are saved. In particular, with reference to equation A above, this comprises saving only the accumulated contributions of the received data packets to the evaluation of equation A. Then, in accordance with such an embodiment, equation A is completely evaluated, when the contribution of the third, incorrectly received data packet to equation A is added to the saved, accumulated contributions of the previously received data packets.

In a further embodiment of the present invention wherein a moving window of a predetermined number of data packets is used for predicting a correctly received data packet, accumulated prior partial sums for the incorrectly received data & packets, i.e., the sum of prior contributions $a_jb_j(i)$, are utilized as a rapid method for accumulating a sum, for example, the sum in equation A. In particular, the accumulated partial sums are saved along with the individual contributions of the incorrectly received data packets to the accumulated prior partial sum. Then, the contribution of the most recently incorrectly received data packet is determined by adding its contribution to the accumulated prior partial sum and, if the number of incorrectly received data packets exceeds the predetermined number, by subtracting the contribution of the oldest incorrectly received data packet therefrom.

What is claimed is:

1. Method for minimizing retransmissions between modems comprises the steps of:
   receiving a data packet and determining a checksum;
   comparing the checksum with a checksum embedded in the data packet;
   if the checksums are the same, transmitting a signal which indicates that a data packet was received correctly;
   if the checksums are different, determining whether the number of incorrectly received data packets is less than a predetermined threshold, and, if so, saving the data packet with its embedded checksum and transmitting a signal which indicates that a data packet was not received correctly; otherwise, predicting a dat packet from the received data packet and predetermined ones of previously received and saved data packets, including the embedded checksums, and determining a checksum for the predicted data packet;
   if the embedded checksum in the predicted data packet matches the determined checksum for the predicted data packet, transmitting a signal which indicates that a data packet was received correctly; and
   if the embedded checksum in the predicted data packet does not match the determined checksum for the predicted data packet, saving the newly received data packet with its embedded checksum and transmitting a signal which indicates that a data packet was not received correctly;
   wherein the step of predicting a data packet comprises bit averaging the received data packet and predetermined ones of previously received and saved data packets.

2. The method of claim 1 wherein the step of predicting comprises bit averaging the received data packet and two previously, incorrectly received and saved data packets.

3. The method of claim 2 wherein $b_c(i)$ denotes the ith bit averaged bit of the predicted data packet and $b_c(i)$ is determined as follows:

$$b_c(i) = b_1(i)*b_2(i) + b_{1II}(i)*b_3(i) + b_2(i)*b_3(i)$$

where:
- $b_1(i)$ = the ith bit of a first previously received data packet
- $b_2(i)$ = the ith bit of a second previously received data packet
- $b_3(i)$ = the ith bit of the received data packet and
- $*$ denotes the logical AND operation
- $+$ denotes the logical OR operation 4. The method of claim 2 wherein $b_c(i)$ denotes the ith bit averaged bit of the predicted data packet and $b_c(i)$ is determined as follows:

$$\text{if } [a_1 b_1(i) + a_2 b_2(i) + a_3 b_3(i)] < (a_1 + a_2 + a_3)/2, \text{ then}$$
$$b_c(i) = 0$$

$$\text{if } [a_1 b_1(i) + a_2 b_2(i) + a_3 b_3(i)] > (a_1 + a_2 + a_3)/2, \text{ then}$$
$$b_c(i) = 1$$

where:
- $b_1(i)$ = the ith bit of a first previously received data packet
- $b_2(i)$ = the ith bit of a second previously received data packet
- $b_3(i)$ = the ith bit of the received data packet
- $a_1$ = the weight of the first previously received data packet
- $a_2$ = the weight of the second previously received data packet
- $a_3$ = the weight of the received data packet and
- $+$ denotes an arithmetic operation 5. The method of claim 2 wherein $b_c(i)$ denotes the ith bit averaged bit of the predicted data packet and $b_c(i)$ is determined as follows:

$$\text{if } \underset{j=1}{\overset{n}{\text{Sum}}}[a_j b_j(i)] < \left[\underset{j=1}{\overset{n}{\text{Sum}}}(a_j)\right]/2, \text{ then} \quad (i)$$

$$b_c(i) = 0$$

$$\text{if } \underset{j=1}{\overset{n}{\text{Sum}}}[a_j b_j(i)] \geq \left[\underset{j=1}{\overset{n}{\text{Sum}}}(a_j)\right]/2, \text{ then} \quad (ii)$$

$$b_c(i) = 1$$

where:
- n is the number of incorrectly received data packets which are used in the average
- $b_j(i)$ = the ith bit of the jth previously received data packet
- $a_j$ = the weight of the jth previously received data packet and
- $+$ denotes an arithmetic operation 6. Method for minimizing retransmissions between modems comprises the steps of:
   receiving a data packet and determining a checksum;
   comparing the checksum with a checksum embedded in the data packet;
   if the checksums are the same, transmitting a signal which indicates that a data packet was received correctly;
   if the checksums are different, determining whether the number of incorrectly received data packets is less than a predetermined threshold, and, if so, determining and saving the following partial sums for each bit in a data packet, including the embedded checksum:

$$a_r b_r(i) + [\text{accumulated prior partial sums}]$$

where:
- $a_r$ = the weight of the received data packet which is used in a prediction
- $b_r(i)$ = the ith bit of the received data packet which is used in the prediction represents sums of terms of the form $a_j b_j(i)$ for predetermined incorrectly received data packets which are used in the prediction and transmitting a signal which indicates that a data packet was not received correctly;
otherwise, determining the prediction sum for each bit in a data packet, including the embedded checksum, as follows:

$$a_r b_r(i) + [\text{accumulated prior partial sums}]$$

predicting a data packet from the prediction sums as follows, where $b_c(i)$ is the ith bit in the predicted data packet:

$$\text{if prediction sum} < \left[\underset{j=1}{\overset{n}{\text{Sum}}}(a_j)\right]/2, \text{ then} \quad (i)$$

$$b_c(i) = 0$$

$$\text{if prediction sum} \geq \left[\underset{j=1}{\overset{n}{\text{Sum}}}(a_j)\right]/2, \text{ then} \quad (ii)$$

$$b_c(i) = 1$$

where
- n is the number of incorrectly received data packets which are used in the average
- $a_j$ = the weight of the jth previously received data packet which is used in the prediction and
- $+$ denotes an arithmetic operation and determining a checksum for the predicted data packet;
   if the embedded checksum in the predicted data packe matches the determined checksum for the predicted data packet, transmitting a signal which indicates that a data packet was received correctly; and
   if the embedded checksum in the predicted data packet does not match the determined checksum for the predicted data packet, saving the prediction sums as the accumulated prior partial sums and transmitting a signal which indicates that a data packet was not received correctly.

7. Method for minimizing retransmissions between modems comprises the steps of:
   receiving a data packet and determining a checksum;
   comparing the checksum with a checksum embedded in the data packet;
   if the checksums are the same, transmitting a signal which indicates that a data packet was received correctly;
   if the checksums are different, determining whether the number of incorrectly received data packets is less than a predetermined threshold, and, if so, determining and saving $a_r b_r(i)$ and the following partial sums for each bit in a data packet, including the embedded checksum:

$$a_r b_r(i) + [\text{accumulated prior partial sums}]$$

$a_r$ = the weight of the received data packet which is used in a prediction $b_r(i)$ = the ith bit of the received data packet which is used in the prediction represents sums of terms of the form $a_j b_j(i)$ for predetermined incorrectly received data packets which are used in the prediction and transmitting a signal which indicates that a data packet was not received correctly;

otherwise, determining the prediction sum for each bit in a data packet, including the embedded checksum, as follows:

$$a_r b_r(i) + [\text{accumulated prior partial sums}]$$

where $b_o(i)$ is the ith bit of the oldest received data packet included in the accumulated prior partial sum and $a_o$ is the weight of the oldest received data packet predicting a data packet from the prediction sums as follows, where $b_c(i)$ is the ith bit in the predicted data packet:

(i) if prediction sum for ith bit $< \left[ \sum_{j=1}^{n} \text{Sum}(a_j) \right] / 2$, then $$b_c(i) = 0$$

(ii) if prediction sum for ith bit $\geq \left[ \sum_{j=1}^{n} \text{Sum}(a_j) \right] / 2$, then $$b_c(i) = 1$$

where:
n is the number of incorrectly received data packets which are used in the average
$a_j$ = the weight of the jth previously received data packet which is used in th prediction and
+ denotes an arithmetic operation and determining a checksum for the predicted data packet;

if the embedded checksum in the predicted data packet matches the determined checksum for the predicted data packet, transmitting a signal which indicates that a data packet was received correctly; and if the embedded checksum in the predicted data packet does not match the determined checksum for the predicted dat packet, saving the prediction sums as the accumulated prior partial sums and $a_r b_r(i)$ for each bit in a data packet, and transmitting a signal which indicates that a data packet was not received correctly.

* * * * *